United States Patent
Clement et al.

(10) Patent No.: US 11,954,429 B2
(45) Date of Patent: Apr. 9, 2024

(54) AUTOMATED NOTEBOOK COMPLETION USING SEQUENCE-TO-SEQUENCE TRANSFORMER

(71) Applicant: Microsoft Technology Licensing, LLC, Redmond, WA (US)

(72) Inventors: Colin Bruce Clement, Seattle, WA (US); Shubham Chandel, Bellevue, WA (US); Guillermo Serrato Castilla, Seattle, WA (US); Neelakantan Sundaresan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 308 days.

(21) Appl. No.: 17/545,488

(22) Filed: Dec. 8, 2021

(65) Prior Publication Data
US 2023/0177261 A1 Jun. 8, 2023

(51) Int. Cl.
| | |
|---|---|
| *G06F 40/186* | (2020.01) |
| *G06F 3/04815* | (2022.01) |
| *G06F 40/40* | (2020.01) |
| *G06N 3/045* | (2023.01) |

(52) U.S. Cl.
CPC ........ *G06F 40/186* (2020.01); *G06F 3/04815* (2013.01); *G06F 40/40* (2020.01); *G06N 3/045* (2023.01)

(58) Field of Classification Search
CPC .... G06F 40/186; G06F 3/04815; G06F 40/40; G06N 3/045
See application file for complete search history.

(56) References Cited

PUBLICATIONS

Jain et al. "Program Synthesis with Large Language Models", 2022 IEEE/ACM 44th International Conference on Software Engineering (Year: 2022).*
Austin et al. "Program Synthesis with Large Language Models" Google research, 2021 (Year: 2021).*
"Nbgrader", Retrieved from: https://web.archive.org/web/20220419213217/https://nbgrader.readthedocs.io/en/stable/, Apr. 19, 2022, pp. 1-2.

(Continued)

*Primary Examiner* — Bhavesh M Mehta
*Assistant Examiner* — Darioush Agahi
(74) *Attorney, Agent, or Firm* — Schwegman Lundberg & Woessner, P.A.

(57) ABSTRACT

Generally discussed herein are devices, systems, and methods for generating an automatic interactive digital notebook completion model. A method can include receiving notebook content of an interactive digital notebook, the notebook content including a markdown cell followed by a code cell. The method can include generating input/output examples by, for each input/output example by masking one of (i) content of the markdown cell or (ii) content of the code cell resulting in a masked cell, identifying the masked cell and content of another cell of the markdown cell or the code that is not masked as an input for an input/output example, and identifying the content of the masked cell as an output for the input/output example. The method can include training, based on the input/output examples, a natural language processing model that generates a prediction of the content of a second masked cell as an output.

20 Claims, 10 Drawing Sheets

(56) References Cited

PUBLICATIONS

Agashe, et al., "A Large Scale Distantly Supervised Dataset for Open Domain Context-based Code Generation", In Repository of arXiv:1910.02216v1, Oct. 5, 2019, 11 Pages.
Austin, et al., "Program Synthesis with Large Language Models", In Repository of arXiv:2108.07732v1, Aug. 16, 2021, pp. 1-34.
Brochart, et al., "jupyter / nbclient", Retrieved from: https://github.com/jupyter/nbclient, Aug. 16, 2021, pp. 1-3.
Brown, et al., "Language Models are Few-Shot Learners", In Repository of arXiv:2005.14165v1, May 28, 2020, pp. 1-72.
Bruch, et al., "Learning from Examples to Improve Code Completion Systems", In Proceedings of the 7th joint meeting of the European software engineering conference and the ACM SIGSOFT symposium on the foundations of software engineering, Aug. 23, 2009, pp. 213-222.
Chen, et al., "Evaluating Large Language Models Trained on Code", In Repository of arXiv:2107.03374v1, Jul. 7, 2021, 35 Pages.
Chen, et al., "Gmail Smart Compose: Real-Time Assisted Writing", In Proceedings of the 25th ACM SIGKDD International Conference on Knowledge Discovery & Data Mining, Aug. 4, 2019, pp. 2287-2295.
Clement, et al., "PYMT5: Multi-Mode Translation of Natural Language and Python Code with Transformers", In Proceedings of the Conference on Empirical Methods in Natural Language Processing, Nov. 16, 2020, pp. 9052-9065.
Drain, et al., "Generating Bug-Fixes Using Pretrained Transformers", In Repository of arXiv:2104.07896v1, Apr. 16, 2021, 11 Pages.
Feng, et al., "CodeBERT: A Pre-Trained Model for Programming and Natural Languages", In Proceedings of the 2020 Conference on Empirical Methods in Natural Language Processing: Findings, Nov. 16, 2020, pp. 1536-1547.
Hendrycks, et al., "Measuring Coding Challenge Competence With APPS", In Repository of arXiv:2105.09938v1, May 20, 2021, pp. 1-16.
Husain, et al., "CodeSearchNet Challenge Evaluating the State of Semantic Code Search", In Repository of arXiv:1909.09436v1, Sep. 20, 2019, 6 Pages.
Kaplan, et al., "Scaling Laws for Neural Language Models", In Repository of arXiv:2001.08361v1, Jan. 23, 2020, pp. 1-30.
Keskar, et al., "CTRL: A Conditional Transformer Language Model for Controllable Generation", In Repository of arXiv:1909.05858v1, Sep. 11, 2019, pp. 1-18.
Lewis, et al., "BART: Denoising Sequence-to-Sequence Pre-training for Natural Language Generation, Translation, and Comprehension", In Repository of arXiv:1910.13461v1, Oct. 29, 2019, 10 Pages.
Radford, et al., "Improving Language Understanding by Generative Pretraining", Retrieved from: https://s3-us-west-2.amazonaws.com/openaiassets/researchcovers/languageunsupervised/language understanding paper.pdf, Jun. 11, 2018, 12 Pages.
Raychev, et al., "Code Completion with Statistical Language Models", In Proceedings of the 35th ACM SIGPLAN Conference on Programming Language Design and Implementation, Jun. 9, 2014, pp. 419-428.
Ren, et al., "CodeBLEU: a Method for Automatic Evaluation of Code Synthesis", In Repository of arXiv:2009.10297v1, Sep. 22, 2020, 8 Pages.
Svyatkovskiy, et al., "IntelliCode Compose: Code Generation using Transformer", In Proceedings of the 28th ACM Joint Meeting on European Software Engineering Conference and Symposium on the Foundations of Software Engineering, Nov. 8, 2020, pp. 1433-1443.
Svyatkovskiy, et al., "Pythia: Al-assisted Code Completion System", In Proceedings of the 25th ACM SIGKDD International Conference on Knowledge Discovery & Data Mining, Aug. 4, 2019, pp. 2727-2735.
Tufano, et al., "Generating Accurate Assert Statements for Unit Test Cases using Pretrained Transformers", In Repository of arXiv:2009.05634v1, Sep. 11, 2020, 10 Pages.
Vaswani, et al., "Attention Is All You Need", In Proceedings of Advances in neural information processing systems, Dec. 4, 2017, pp. 1-11.
Zhai, et al., "CPC: Automatically Classifying and Propagating Natural Language Comments via Program Analysis", In Proceedings of the ACM/IEEE 42nd International Conference on Software Engineering, May 23, 2020, pp. 1359-1371.
Chandel, et al., "Training and Evaluating a Jupyter Notebook Data Science Assistant", In Journal of arXiv preprint arXiv:2201.12901, Jan. 30, 2022, pp. 1-8.
Jain, et al., "Jigsaw: Large Language Models meet Program Synthesis", In Repository of arXiv:2112.02969v1, Dec. 6, 2021, 12 Pages.
Liu, et al., "HAConvGNN: Hierarchical Attention Based Convolutional Graph Neural Network for Code Documentation Generation in Jupyter Notebooks", In Repository of arXiv:2104.01002v2, Sep. 8, 2021, 13 Pages.
"International Search Report and Written Opinion Issued in PCT Application No. PCT/US22/048112", dated Feb. 3, 2023, 13 Pages.
Phan, et al., "CoTexT: Multi-task Learning with Code-Text Transformer", In Repository of arXiv:2105.08645v4, Jun. 21, 2021, 8 Pages.
Wang, et al., "CodeT5: Identifier-aware Unified Pre-trained Encoder-Decoder Models for Code Understanding and Generation", In Repository of arXiv:2109.00859v1, Sep. 2, 2021, 13 Pages.

\* cited by examiner

READING IN THE FILES
BASED ON THE ABOVE INFORMATION, LET'S ATTEMPT TO LOAD businesses.csv ▷ #MAKE SURE TO USE THESE NAMES ⟵ 330
   bus = pd.read_csv('data/businesses.csv', encoding = 'ISO-8859-1')

WE OFTEN WANT TO CLEAN THE DATA TO IMPROVE OUR ANALYSIS. THIS CLEANING MIGHT INCLUDE CHANGING VALUES FOR A VARIABLE OR DROPPING RECORDS. MODIFY THE DERIVED FIELD zip_code TO REPLACE 94602 WITH A BETTER ALTERNATIVE OF 94102.

bus['zip_code'] = bus['zip_code'].str.replace('94602', '94102')  ⟵ 332 assert "94602" not in bus['zip_code']  ⟵ 334
assert "94102" in bus['zip_code']

REMOVE ALL NON-ALPHABETICAL CHARACTERS
SIMPLY GO THROUGH EACH WORD AND REMOVE EVERY CHARACTER THAT IS NOT AN ALPHABETICAL CHARACTER

▷ def keep_letters(words):  ⟵ 336
    #Substitutes every non-alphabetical characters with ''
    words = [re.sub('[^A-Za-z]', '', word) for word in words]
    #Use filter to remove all empty strings
    words = list(filter(None, words))
    return words

CONVERT EVERYTHING TO LOWER CASE def to_lower(words):  ⟵ 338
    """
    #Substitutes every word with lowercase letter
    words = [words.lower() for word in words]
    #Use filter to remove all empty strings
    """

FIG. 3

```
1 QUESTION 1C: READING IN THE FILES
BASED ON THE ABOVE INFORMATION, LET'S ATTEMPT TO LOAD businesses.csv

#MAKE SURE TO USE THESE NAMES
bus = pd.read_csv('data/businesses.csv', encoding = 'ISO-8859-1')

QUESTION 1D
WE OFTEN WANT TO CLEAN THE DATA TO IMPROVE OUR ANALYSIS. THIS CLEANING
MIGHT INCLUDE CHANGING VALUES FOR A VARIABLE OR DROPPING RECORDS.
LET'S MODIFY THE DERIVED FIELD zip_code TO REPLACE 94602 WITH A BETTER
ALTERNATIVE OF 94102.

WRITE CODE HERE
assert "94602" not in bus['zip_code']
assert "94102" in bus['zip_code']
```

```
bus['zip_code'] = bus['zip_code'].str.replace('94602', '94102')
```

FIG. 4

AUTOMATED NOTEBOOK COMPLETION USING SEQUENCE-TO-SEQUENCE TRANSFORMER

BACKGROUND

One focus of machine learning research is to build intelligent assistants which can fill-in or predict information based on a context provided by a user. These assistants can be as simple as next-word or phrase prediction or as complex as conversational agents based on language models. Much work has been done to use these assistants to solve natural language tasks and to solve software engineering tasks.

Large language models and transformers have unlocked consistent improvements in natural language processing (NLP) and in code synthesis from natural language and examples, code completion, code search, bug fixing and detection, unit test generation, and many other applications. Extending the evaluation of these transformers beyond traditional NLP metrics other works have introduced HumanEval and Mostly Basic Programming Problems (MBPP) respectively. HumanEval and MBPP are sets of natural language descriptions of programs along with unit tests and ground truth Python implementations. By compiling and executing generated hypotheses for these Python programs, these works established generally that larger models solve more problems and that drawing more samples (giving the models more attempts) can solve more problems. Further, human-in-the-loop feedback with model hypotheses can help the model overcome incorrect solutions. Generally, though, models still struggle to compose descriptions of chains of multiple operations.

SUMMARY

Embodiments regard a device, system, method, and computer-readable medium configured for notebook completion or checking. Embodiments can provide a suggestions in an interactive, interpreted computational notebook environment using an agent, a trained natural language processing model, that can offer a suggestion to solve a problem (e.g., in data science) via an interactive digital notebook. Embodiments provide a model that has an ability to solve data science, college-level computer science, and other problems presented via cells of the notebook. Notebooks are used widely in both education and business, promoting easily shareable self-documented code in one user experience.

A method, in accord with embodiments, can include receiving notebook content of an interactive digital notebook, the notebook content including a sequence of respective cells comprising a markdown cell immediately followed by a code cell, the markdown cell indicating code that is to be entered in the code cell. The method can include generating input/output examples. This can include, for each input/output example masking one of (i) content of the markdown cell or (n) content of the code cell resulting in a masked cell, identifying the masked cell and content of another cell of the markdown cell or the code that is not masked as an input for an input/output example, and identifying the content of the masked cell as an output for the input/output example. The method can include training, based on the input/output examples, a natural language processing model that generates a prediction of the content of a second masked cell as an output.

The received notebook content can further include a grading cell immediately after the code cell or the markdown cell, the grading cell including content that tests whether the code in the code cell of the markdown cell is accurate. The grading cell can be provided as part of the input of the input/output example. Masking one of the (i) content of the markdown cell or (ii) content of the code cell resulting in a masked cell can include masking the content of the code cell. Masking one of the (i) content of the markdown cell or (ii) content of the code cell resulting in a masked cell can include masking the content of the markdown cell.

The method can further include providing a control code to the natural language processing model indicating whether the masked cell is the markdown cell or the code cell. The control code can further indicate whether the markdown cell includes a header, formula, or a combination thereof. The control code can further indicate whether the code cell includes a function definition, includes a class, includes an import statement, or a combination thereof.

The natural language processing model can be a sequence-to-sequence transformer model. The method can further include evaluating the natural language processing model based on whether the code generated by the natural language processing model in predicting the contents of the code cell passes the tests in the grading cell. The method can further include executing the natural language model to generate multiple hypotheses of solutions to the code to be entered and presenting only hypotheses that are consistent with content in the grading cell. The method can further include executing the natural language processing model based on input of a first type, the input including a masked cell. The method can further include providing output, of a second different type, from the natural language processing model as contents of the masked cell, wherein the first type is one of markdown or code and the second type is the other of markdown or code.

A system can include processing circuitry and a memory including instructions that, when executed by the processing circuitry, cause the processing circuitry to perform operations of the method. A non-transitory machine-readable medium can include instructions that, when executed by a machine, cause the machine to perform operations of the method.

BRIEF DESCRIPTION OF DRAWINGS

FIG. 3 illustrates, by way of example, a block diagram of an embodiment of a view of a completed interactive digital notebook.

FIG. 4 illustrates, by way of example, a block diagram of an embodiment of an input/output example with a masked code cell.

DETAILED DESCRIPTION

Figure 1:
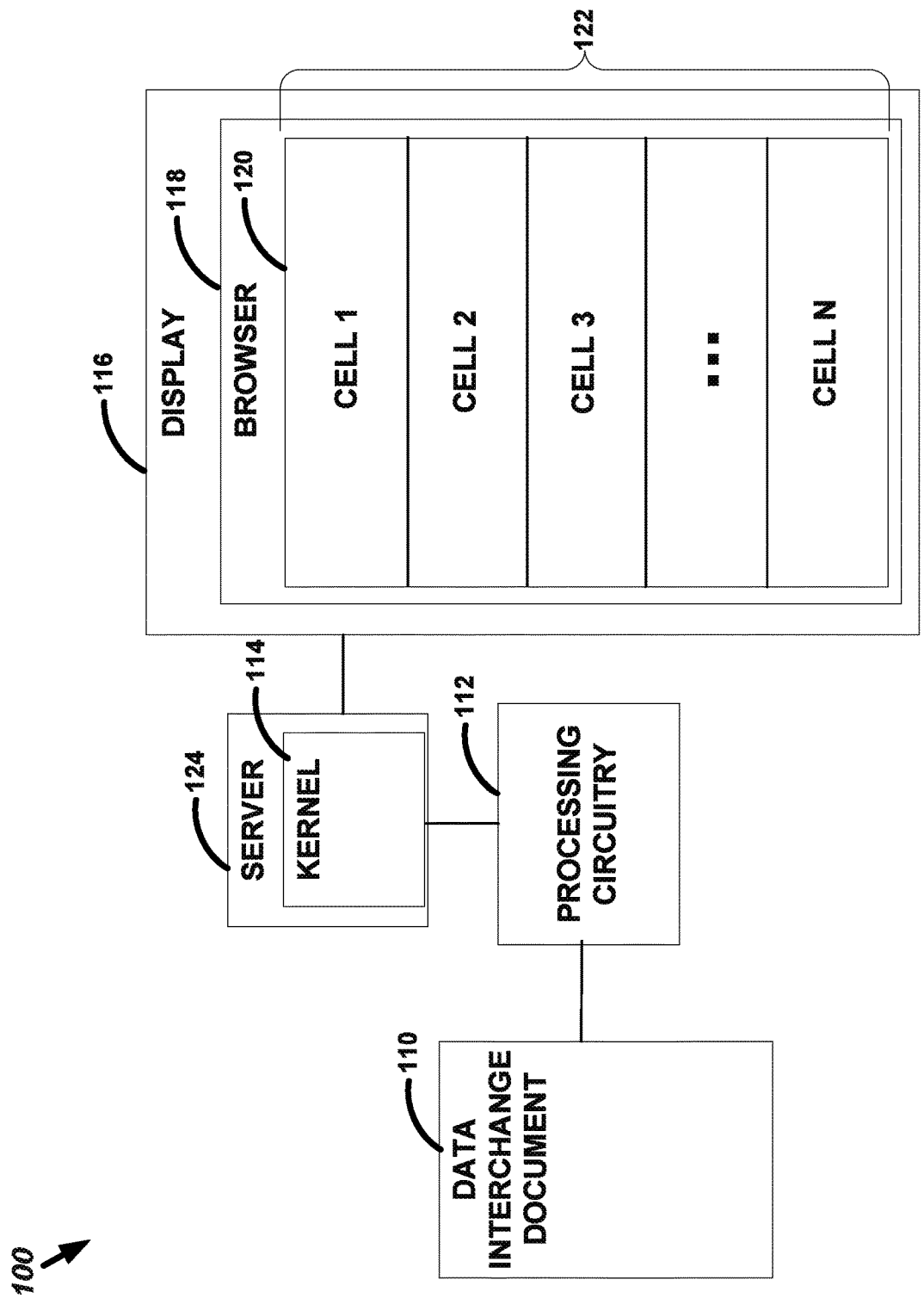
FIG. 1 illustrates, by way of example, a block diagram of an embodiment of an interactive digital notebook environment.

While recent works evaluate general-purpose coding, there is an opportunity to focus on an assistant which offers suggestions in an interactive, interpreted computational notebook environment. Embodiments regard an agent, a trained natural language processing model, that can offer a suggestion to solve a problem (e.g., in data science) via an interactive digital notebook. An interactive digital notebook, in accord with embodiments, is not a paper or bound item that is filled in with pen and pencil. An interactive digital notebook, in accord with embodiments, is a digital entity that is provided via a user interface, An interactive digital notebook is a digital document produced by an interactive digital notebook application. The interactive digital notebook contains computer code and rich text elements (e.g., text, equations, figures, links, etc.). A user can access the interactive digital notebook using a notebook interface. The notebook interface is a user interface that provides the user access to the functionality of the interactive digital notebook. The interactive digital notebook has a variety of purposes, such as statistics, data science, machine learning, computer algebra, or other subject sharing or learning. The interactive digital notebook may simply be referred to as a "notebook" herein.

A notebook is an interactive document that freely mixes code, code execution results, graphics, markdown text and arbitrary hypertext markup language (HTML)/JavaScript elements as defined in a notebook standard, such as the Jupyter Notebook standard. The cell is an individual input field that can receive multiple lines of input. The notebook is made of a plurality of cells. The cells are typically provided in a sequence such that content of an immediately subsequent cell and an immediately prior cell are related to the cell.

The notebook extends a console-based approach to interactive computing in a qualitatively new direction, providing a web-based application suitable for capturing a computation process: developing, documenting, and executing code, as well as communicating or even testing the results. The functionality of notebooks makes them popular for use as electronic lab notebooks, such as to document research procedures, data, calculations, and findings. Notebooks provide a way to track a methodology, such as to make it easier to reproduce results and calculations with different data sets. Notebooks are sometimes used in place of a slide presentation application as they allow for execution of code snippets inside the notebook environment.

Embodiments provide a model that has an ability to solve data science, college-level computer science, and other problems presented via cells of the notebook. As noted previously, notebooks are hybrid code and documentation environments. Notebooks are organized by cells, containing rich markdown cells, presentation cells, code cells, and output cells. Notebooks are used widely in both education and business, promoting easily shareable self-documented code in one user experience.

FIG. 1 illustrates, by way of example, a block diagram of an embodiment of a notebook environment 100. The notebook environment 100 includes a data interchange document 110, a kernel 104 operating on a local or remote server 124, processing circuitry 106, and a display 108. The data interchange document 110 stores and transmits data objects. The data Objects are represented using attribute-value pairs and arrays (or other serializable values). Examples of data interchange document formats includes JavaScript Object Notation (JSON), YAML, Ain't Markup Language, Avro, OData, JavaScript, Protobuf, and MessagePack, among others. The data interchange document 110 defines the presentation of a notebook 122 on the display 116. The notebook 122 in FIG. 1 is the joint combination of cells 120 and the contents in the cells.

The processing circuitry 112 can be local or remote to a client machine and operate to provide the functionality of the notebook 122 on the display 116. The processing circuitry 112 interprets the data from the data interchange document 110 and provides a corresponding visual presentation of that data on the display 116. The processing circuitry 112 can include software, hardware, firmware, or a combination thereof. Hardware can include electric or electronic components configured to perform operations of the processing circuitry 112. The electric or electronic components can include one or more resistors, transistors, capacitors, diodes, inductors, logic gates (e.g., AND, OR, XOR, negate, buffer, or the like), amplifiers, memory devices, power supplies, analog to digital converters, digital to analog converters, oscillators, switches, multiplexers, buses, input/output ports, or the like.

The processing circuitry 112 can issue a request to the kernel 114 to perform an operation. The kernel 114 is an execution environment that is capable of executing code in a specified programming language. Example programming languages include Julia, R, Haskell, Ruby, and Python. Other programming languages are provided. The kernel 114 is an operating system process that communicates, typically, using ZeroMQ connections. The kernel 114 receives a code snippet from the processing circuitry 112 to execute. The kernel 114 executes the code snippet and returns the result/output of the execution. A notebook kernel, such as the kernel 114, is distinct from an operating system kernel.

The notebook 122 is typically stored in cloud or server-based storage, such as on the server 124, and is presented and accessed through a web browser 118. The browser 118 provides the interface through which a user interacts with the notebook 122. The web browser 118 provides a means for the user to access the internet. Since the notebook 122 is a specialized document that operates using a variety of programming languages via different, respective kernels 114, the notebook is typically edited by accessing a specialized computing environment through the web browser 118. Example web browsers 118 include Edge, Firefox®, Opera, among many others.

The notebook 122 is comprised of cells 120. Each cell 120 can include text, images, graphics, or other markdown, programming code, JavaScript/HTML elements, one or more user-defined cells, or the like. The cells 120 are typically sequential. The content in "Cell 1", for example, relates to content in a next cell, "Cell 2", and so on. For example, Cell 1 can include a prompt for a user. The user can then write code in Cell 2 that attempts to satisfy the prompt in Cell 1. Then, Cell 3 can include code that tests whether the code in Cell 2 satisfies the prompt. Note that this is merely a simple example, and the content of each cell is flexible and widely varied for many use cases and corresponding content.

Example cell types include prompt (sometimes called "markdown"), code, and user-defined celles. A prompt cell holds content, such as an image, rich text, equation (e.g., in LaTex, Word, or another format), graphic, or the like. A code cell holds programming language code and corresponding code comments. A grading cell is a special type of code cell that holds programming language code and corresponding comments that are intended to test the performance of code presented in another code cell.

As a user manages information using the notebook 122, it can be beneficial to help the user check their work or help the user complete the content of the notebook 122. For example, if a user enters a prompt describing code that performs specified functionality, it would be beneficial to automatically generate the code in a code cell immediately after the prompt cell that includes the prompt. In another example, if a user enters code in a code cell, it would be beneficial to automatically generate a corresponding prompt for the code in a prompt cell, immediately before the code cell, that describes the functionality of the code in the code cell. The description of the functionality of the code is sometimes called code summarization or documentation. Such a configuration allows a user to review and edit the automatically generated code or description and verify it is accurate with less effort than would be required to generate the code or description from scratch. Such a configuration allows the user to save time and cost in generating the notebook 122.

Figure 2:
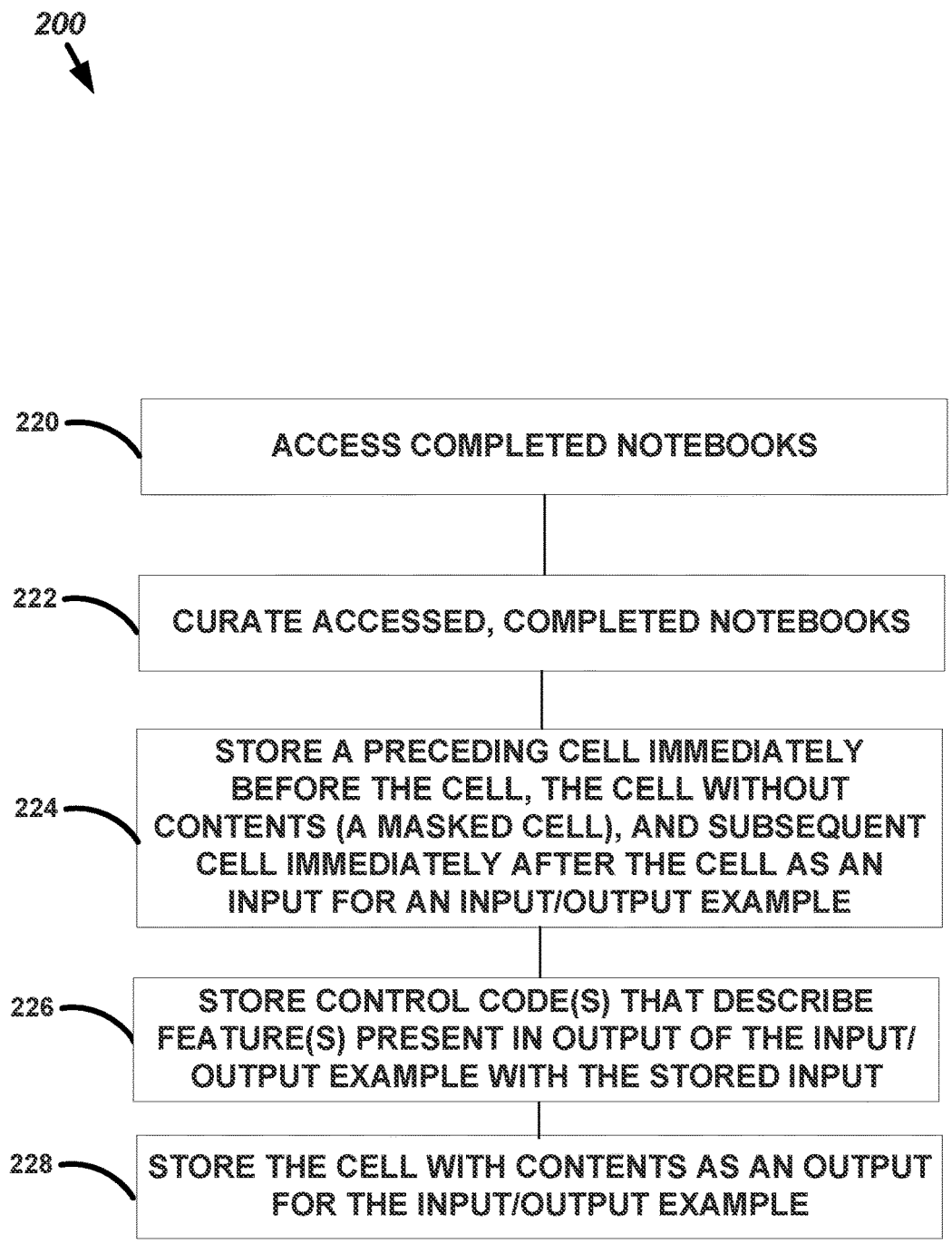
FIG. 2 illustrates, by way of example, a block diagram of an embodiment of a method for training data generation.

FIG. 2 illustrates, by way of example, a block diagram of an embodiment of a method 200 for training data generation. The method 200 as illustrated includes accessing completed notebooks, at operation 220; curating notebooks accessed at operation 220, at operation 222; storing a preceding cell immediately before the cell, the cell without contents, and subsequent cell immediately after the cell as input for an input/output example, at operation 224; storing, with the input of the input/output example, one or more control codes that describe one or more feature(s) present in the corresponding output of the input/output example, at operation 226; and storing the cell with contents as an output for the input/output example, at operation 228.

The operation 220 can include receiving or retrieving notebooks, or a combination thereof. Completed notebooks are stored in a variety of places, including on online repositories, such as GitHub, provided by GitHub, Inc. of San Francisco, California, enterprise repositories, or private repositories. The operation 222 can include filtering the notebooks, or portions of the notebooks, accessed in operation 220. The filtering can include retaining only notebooks with code in a specified programming language, only notebooks that execute within a specified timeframe (e.g., one minute, five minutes, ten minutes, a greater or lesser amount of time, or some time therebetween), only notebooks that can load their data dependencies, only notebooks that can operate in a specified programming language library, only notebooks that include code checking (grading cells), only notebooks with grading cells that follow code cells, only notebooks that include grading cells that reference a defined method name, function name, variable name or class name from the code cell, only notebooks that include prompt cells that detail the code to be provided in the code cell and include a grading cell after the code cell, a combination thereof, or the like. With all of these filters on the notebooks in the GitHub repository, the inventors identified over 300 notebooks with over 1000 cells that can be used for generating input/output examples. The operations 224 and 226 are described in more detail elsewhere.

FIG. 3 illustrates, by way of example, a block diagram of an embodiment of a view of a completed notebook 122. The notebook 122 as illustrated includes cells 330, 332, 334, 336, 338, The cells 330, 332, 334, 336, 338 include prompt cells 330 and 336, code cells 332, 338, and a grading cell 334. The prompt cell 330 defines the problem (in this case to load a dataset and modify zip codes). The code cell 332 is to be filled by the user attempting to solve the problem described in the prompt cell 330 immediately preceding the code cell 332. The grading cell 334 tests whether the code in the code cell 332 provides a valid solution to the problem defined in the prompt cell 330. The prompt cell 336 describes how to solve another problem, in this example removing non-alphabetical characters from a file. Then the prompt cell 336 asks the user to solve a similar problem of converting all words of a file to lowercase. The code cell 338 is an example of programming language code, that when executed, attempts to change words of a file to lowercase. As can be seen, the prompt cell can also provide an example of code to solve a similar or same problem. For example, prompt cell 336 provides an example of code that attempts to convert non-alphabetic strings.

To generate input/output examples for a sequence-to-sequence transformer model, one of the cells 330, 332, 334, 336, 338 can be masked. The masked cell, along with one or more cells that immediately precede the masked cell (if there is one) and one or more masked cells that immediately follow the masked cell (if there is one). The contents of the cell can be stored as the output for the input/output example.

FIG. 4 illustrates, by way of example, a block diagram of an embodiment of an input/output example 440 with a masked code cell. The input/output example 440 of FIG. 4 is provided from the example notebook in FIG. 3. The input/output example 440 includes the cell 330, masked cell 442, and the cell 334 as input. The input/output example 440 further includes the cell 332 as the output. The cell 332 includes the contents of the masked cell 442 before masking. The input 444 includes the masked cell 442 and one or more cells immediately prior to the masked cell in the notebook 122 (e.g., the cell 330 in this example) and one or more cells immediately subsequent to the masked cell in the notebook 122 (e.g., the cell 334 in this example). FIG. 4 provides an example of masking a code cell and generating an input/output example 440 accordingly. This is merely an example. Instead of masking the code cell 332, the prompt cell 330 or the grading cell 334 could be masked. Then one or more of the cells immediately before and immediately subsequent to the cells 330, 334 could be provided as input to an input/output example and the contents of the masked cell (before masking) can be used as output for that input/output example.

Figure 5:
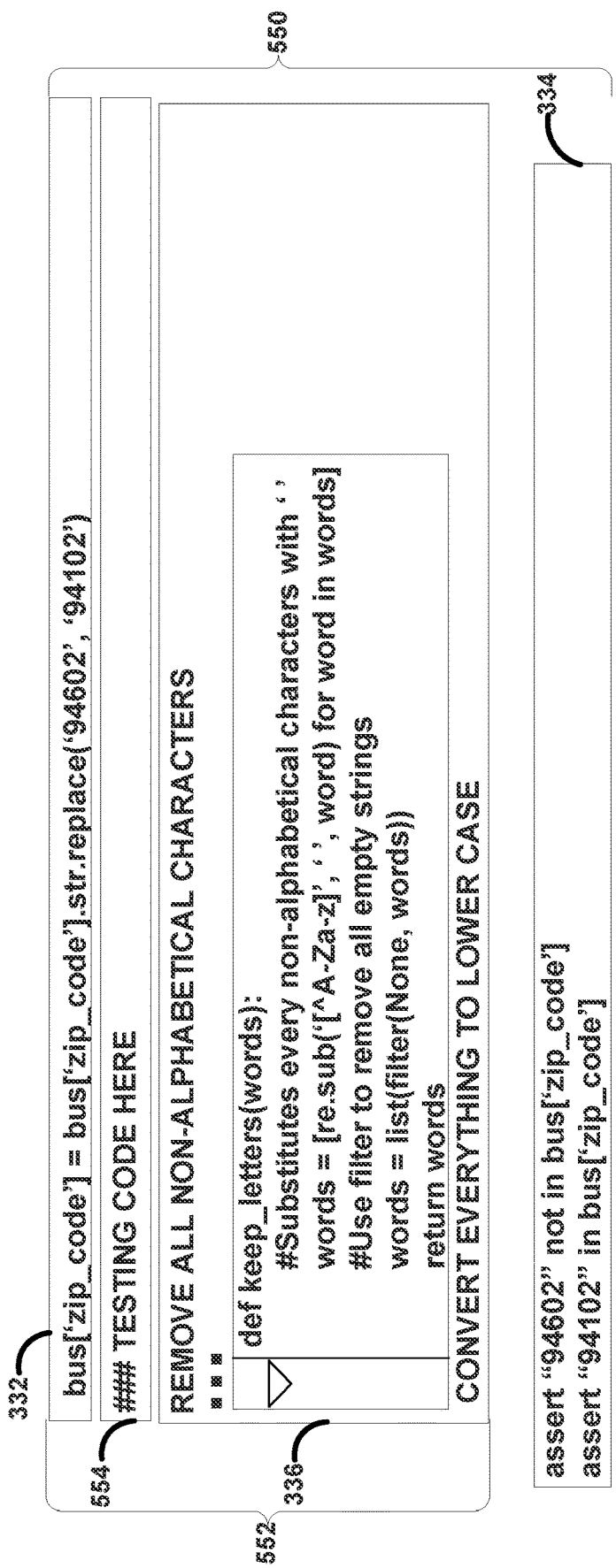
FIG. 5 illustrates, by way of example, a block diagram of an embodiment of an input/output example with a masked grading cell.

FIG. 5 illustrates, by way of example, a block diagram of an embodiment of an input/output example 550 with a masked grading cell. The input/output example 550 of FIG. 5 is provided from the example notebook in FIG. 3. The input/output example 550 includes the cell 332, masked cell 554, and the cell 336 as input. The input/output example 550 further includes the cell 334 as the output. The cell 334 includes the contents of the masked cell 554 before masking. The input 552 includes the masked cell 554 and one or more cells immediately prior to the masked cell in the notebook 122 (e.g., the cell 332 in this example) and one or more cells immediately subsequent to the masked cell in the notebook 122 (e.g., the cell 336 in this example). FIG. 5 provides an example of masking a grading cell and generating an input/output example 550 accordingly. This is merely an example. Instead of masking the grading cell 334, the prompt cell 330 or the code cell 332, for example, could be masked. Then one or more of the cells immediately before and immediately subsequent to the cells 330, 334 could be provided as input to an input/output example and the contents of the masked cell (before masking) can be used as output for that input/output example.

Figure 6:
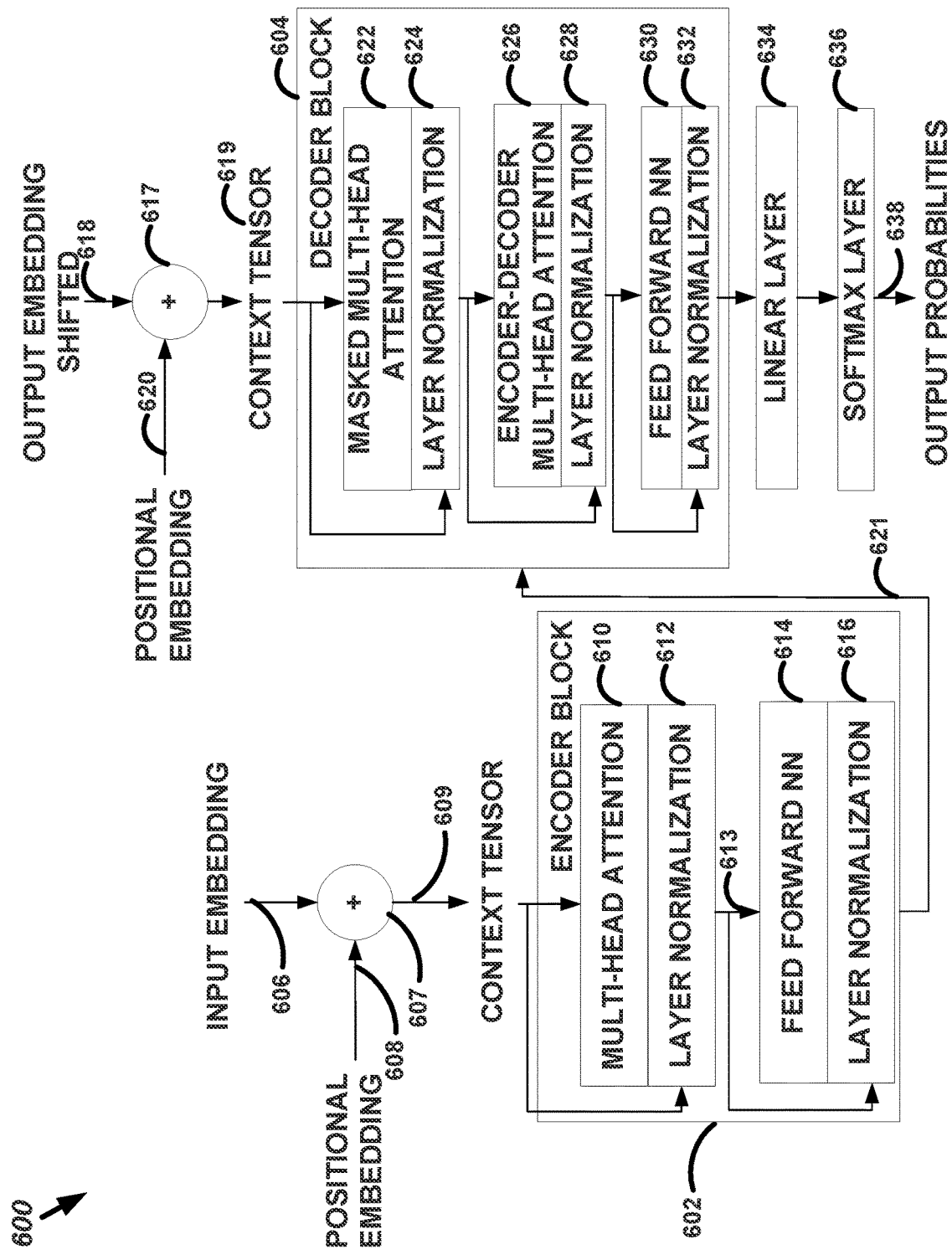
FIG. 6 illustrates, by way of example, a block diagram of an embodiment of a structure of a sequence-to-sequence transformer model.

FIG. 6 illustrates, by way of example, a block diagram of an embodiment of a structure of a sequence-to-sequence transformer architecture 600. The neural transformer architecture 600 can be trained to infer contents of a masked cell based on context in the form of one or more cells immediately before the masked cell and one or more cells immediately after the masked cell. The model architecture 600 includes an encoder-decoder configuration. The neural transformer model architecture 600 includes one or more encoder blocks 602 and one or more decoder blocks 604. The initial inputs to an encoder block 602 are the input embeddings 606 of an input sequence of the training dataset. In order to retain the order of the tokens in the input sequence, positional embeddings 608 are added (represented by adder 607) to the input embedding 606 forming a context tensor 609. The initial inputs to the decoder block 604 are a shifted sequence of the output embeddings 618 from a previous time step to which the positional embeddings 620 are added (represented by adder 617) forming a second context tensor 619.

The encoder block 602, as illustrated, includes two portions. A first portion includes a multi-head attention component 610 followed by a layer normalization component 612. A second portion includes a feed-forward neural network 614 followed by another layer normalization component 616.

The context tensor 609 is input into the multi-head attention 610 of the encoder block 602 as well as the layer normalization component 612. The output of the layer normalization component 612 is input to the feed forward neural network 614 as well as the layer normalization component 616. The output of the encoder block 602 is a set of hidden representations 621. The set of hidden representations 621 is provided to the decoder 604.

Attention can be used to determine which parts of the input sequence are important for a subtoken (an embedding representation of a proper subset of the input), especially when decoding long sequences since the encoder 602 is limited to encoding a fixed-size vector. Attention mechanisms gather information about the relevant context of a given subtoken and then encode that context into a vector which represents the subtoken. Attention is used to identity the relationships between subtokens in the longer sequence while ignoring other subtokens that do not have much bearing on a given prediction.

The multi-head attention component 610 of the encoder block 602 takes a context tensor 609 as input. The multi-head attention component 610 weights the relevance of each subtoken represented in the context tensor 609 relative to each other by generating attention weights for each subtoken in the input embedding 606. In one aspect, the attention function is a scaled dot-product attention which is described mathematically as follows:

$$\text{Attention}(Q, K, V) = \text{softmax}\left(\frac{QK^T}{\sqrt{d_k}}\right)V,$$

where the input includes queries Q and keys K of dimension $d_k$, and values V of dimension $d_v$. Q is a matrix that contains the query or vector representation of one subtoken in a sequence, K is the vector representations of all subtokens in the sequence, and is the vector representations of all the subtokens in the sequence.

The queries, keys, and values are linearly projected h times in parallel with $d_v$ output values which are concatenated to a final value. Multi-head attention is now described.

$$\text{MultiHead}(Q, K, V) = \text{Concat}(\text{head}_1, \ldots, \text{head}_h)W^O,$$

where $\text{head}_i = \text{Attention}(QW_i^Q, KW_i^K, VW_i^V))$ with parameter matrices $W_i^Q \in \mathbb{R}^{d_{model} \times d_k}$, $W_i^K \in \mathbb{R}^{d_{model} \times d_k}$, $W_i^V \in \mathbb{R}^{d_{model} \times d_k}$, and $W^O \in \mathbb{R}^{hd_v \times d_{model}}$.

To reduce the training time of the neural transformer, layer normalization can be used between attention layers. The layer normalization component 612 normalizes the inputs across the features. The mean and standard deviation can be computed across the feature dimensions. There is a first layer normalization component 612 that precedes the feed forward neural network 614 and a second layer normalization component 616 that follows the feed forward neural network 614.

The feed forward neural network 614 processes each output encoding 613 separately. The output (hidden representations 621) of the encoder block 602 is a set of attention vectors K and V which is used by the encoder-decoder multi-head attention component 626 of the decoder block 604.

The decoder block 604 predicts each subtoken $t_i$ in the target language one-by-one at each time step conditioned on all previously-generated target subtokens $t_1, \ldots t_{i-1}$. The decoder block 604 includes three portions. A first portion includes a masked multi-head attention component 622 followed by a layer normalization component 624. The output of the layer normalization component 624 is input into the encoder-decoder multi-head attention component 626 as well as a layer normalization component 628. A second portion includes an encoder-decoder multi-head attention component 626 followed by the layer normalization component 628. The output of layer normalization component 628 is input into the feed forward neural network 630 with as well as a layer normalization component 632. A third portion includes a feed forward neural network 630 followed by a layer normalization component 632.

The masked multi-head attention component 622 receives the output embeddings of the previous timestep. The masked multi-head attention component 622 masks the output embeddings from future time steps. The encoder-decoder multi-head attention component 626 receives queries from the previous decoder layer 625 and the memory keys and values from the output (hidden representations 621) of the encoder block 602. In this manner, the decoder block 604 can attend to every position of the input sequence. The feed forward neural network 630 processes each output encoding separately. A layer normalization component 624, 628, 632 can be used between the layers to normalize the inputs across the features.

The linear layer 634 projects the vector produced by the stack of decoders into a logits vector. The softmax layer 636 then turns the scores of the logits vector into probabilities for each subtoken in the vocabulary which are positive and normalized.

In one aspect, the neural transformer model contains a stack of six encoder blocks and a stack of six decoder blocks which are aggregated into a neural transformer block. The output of each encoder block is passed onto the next encoder block and processed. Each decoder block receives the attention weights computed from the last encoder block. The use of multiple stacked encoder blocks and decoder blocks increases the capacity of the model, allowing the model to learn increasing levels of abstraction.

Figure 7:
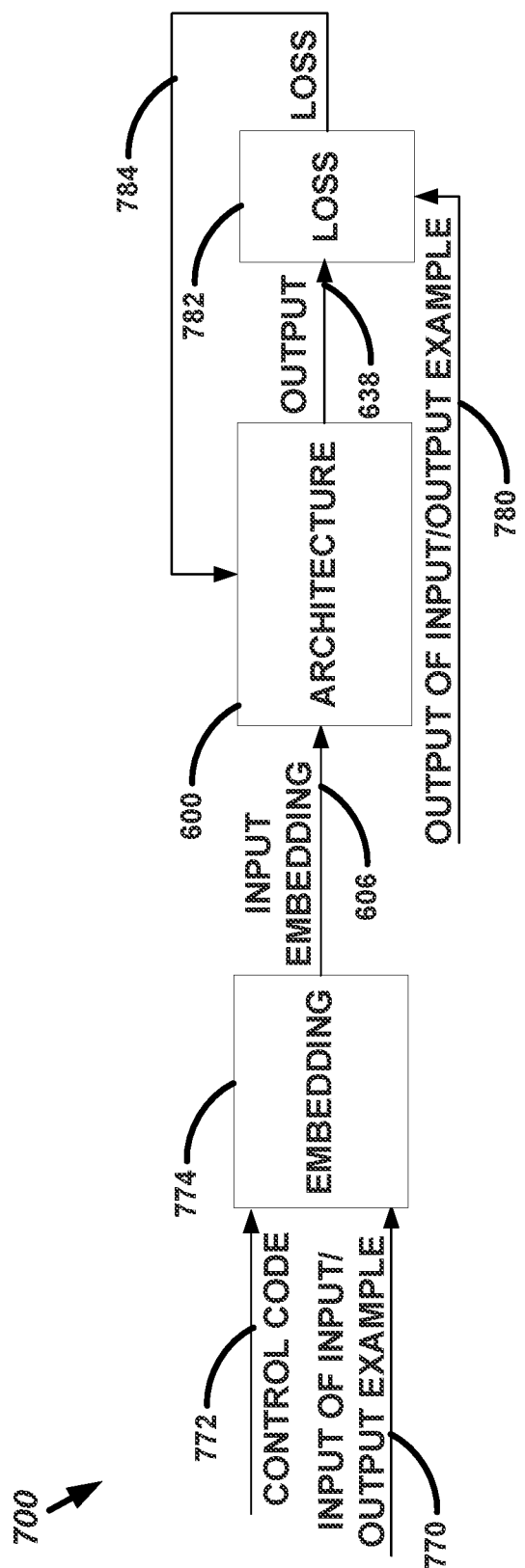
FIG. 7 illustrates, by way of example, a block diagram of an embodiment of a system for architecture training.

FIG. 7 illustrates, by way of example, a block diagram of an embodiment of a system 700 for architecture 600 training. The system 700 as illustrated includes an embedding block 774, the architecture 600, and a loss block 782. The embedding block 774 generates the input embedding 606 that is used as input to the architecture 600. The embedding block 774 projects an input 770, control code 772, or a combination thereof to an embedding space. The embedding block 774 can learn parameters for each token in a vocabulary.

The control code 772 indicates to the architecture 600 which type of cell is to be generated to fill in the masked content of the input 770. The control code 772 can indicate, for example, that the cell is a prompt cell or a code cell. The control code 772 can further indicate whether the prompt cell includes a header, a formula, or a combination thereof. The control code 772 can further indicate whether the code cell includes a function definition, a class, an import statement, or a combination thereof. The control code 772 can be a string, such as to provide a natural language indication of the cell type and high-level contents of the cell that are masked. The control code 772 can be an integer or other number or symbol that can be interpreted to indicate the cell type and high-level contents of the cell.

The input embedding 606, control code 772, or a combination thereof are provided to the architecture 600. The architecture 600 produces an output 780 that is a prediction of the masked content of the input 770. A more detailed description of an example of the architecture is provided regarding FIG. 6.

The loss block 782 receives the output 638 and compares the output 638 to an output 780 of the input/output example. The loss block 782 determines a loss value 784, based on a loss function, such as a cross-entropy loss, a label-smoothed cross-entropy loss, or the like. The loss value 784 is then used to adjust parameters of the architecture 600 in an attempt to make it more accurate. A gradient descent technique can be used to determine the adjustment to the parameters.

Figure 8:
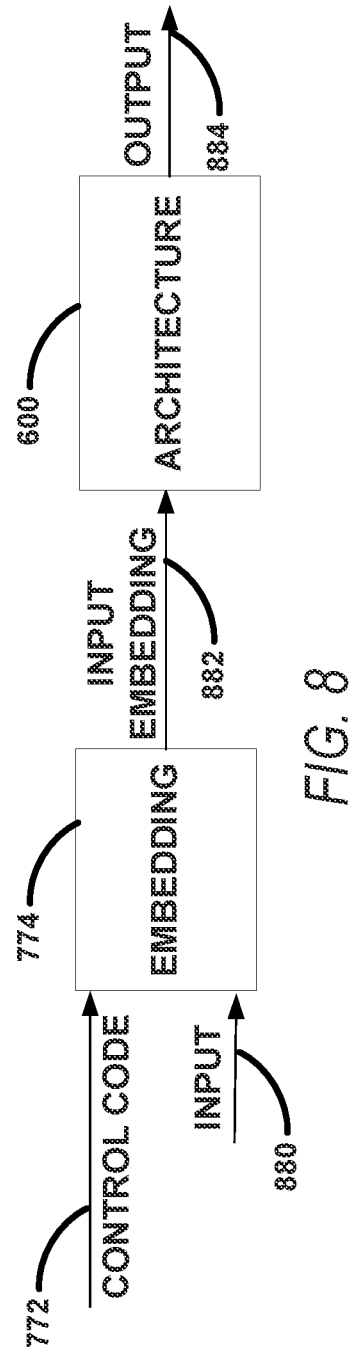
FIG. 8 illustrates, by way of example, a block diagram of an embodiment of a system for automatic cell content generation.

FIG. 8 illustrates, by way of example, a block diagram of an embodiment of a system 800 for automatic cell content generation. The system 800 as illustrated includes the embedding block 774 and the architecture 600. The embedding block 774 receives an input 880 that includes cell contents, with contents of one of the cells masked. The input 880 can be one that has not been seen before by the architecture 600. The embedding block 774 projects the input 880, control code 772, or a combination thereof to the embedding space to generate an input embedding 882. The architecture 600 can receive the control code 772, input embedding 882, or a combination thereof. The architecture 600 produces an output 884 that is a prediction of the masked content of the input 880.

The architecture 600, after training, can operate on input of a first type to determine content of a different, second type. For example, content of a prompt cell can be provided as input to the architecture 600 and the architecture 600 can generate content of a code cell based on the content of the prompt cell. Similarly, content of a code cell can be provided as input and the architecture 600 can produce content of a grading cell based on the content of the code cell or content of a grading or code cell can be provided as input and the architecture 600 can produce content of a prompt cell. The content of the prompt cell is markdown, while content of the grading and code cells are code.

|  |  | pass@k | | | |
|---|---|---|---|---|---|
|  |  | 1 | 10 | 50 | 100 |
| C = 1 | BASELINE | 6.5% | 16.5% | 22.7% | 25.3% |
| C = 1 | MD FOCUSED | 7.1% | 17.3% | 26.2% | 27.8% |
| C = 1 | CELL INFILLING | 22.3% | 53.5% | 65.0% | 67.9% |
| C = 3 | BASELINE | 11.2% | 25.6% | 34.4% | 37.9% |
| C = 3 | MD FOCUSED | 11.2% | 28.4% | 40.6% | 43.9% |
| C = 3 | CELL INFILLING | 33.4% | 63.5% | 73.9% | 77.5% |

TABLE 1: Evaluation of architecture with different training schemes and different number of context cells (c). baseline is training and evaluating on the previous c cells before the target cell, and focused is the same sources and targets restricted to a markdown focused subset. cell infill is c-cells in the input, showing the architecture one cell past the target cell.

Embodiments can operate using a curated set of pedagogical notebooks and data contexts containing rich markdown descriptions of problems, solutions, or unit tests, which uses a teaching tool to automatically evaluate model hypotheses. Problem descriptions in a prompt cell can include natural language with unit tests, featuring LATEX and math, data-dependencies, and implicit dependencies between the problems in a single notebook. A new code-infilling pre-training objective is provided in which each cell in each notebook is considered an output in one input/output example, and the input is the neighboring cells with a control code indicating which cell type to produce and where the output should be inserted. While model size is not explored in depth, a model size with more modest deployment cost is explored by training and evaluating a model size of 350 million (M) parameters (300M non-embedding parameters). This model is trained on the cell-infilling objective and was shown to solve 78% of the DSP tasks given 100 sampled attempts. Model performance improves with larger number of samples, and more context cells also improves the model performance. Surprisingly, training the model with the ability to look ahead a single cell doubles the performance compared to a 3-cell look-back baseline. Showing the model unit tests also improves performance, and the model learns to adapt the solutions to previous problems on a subsequent problem.

Figure 9:
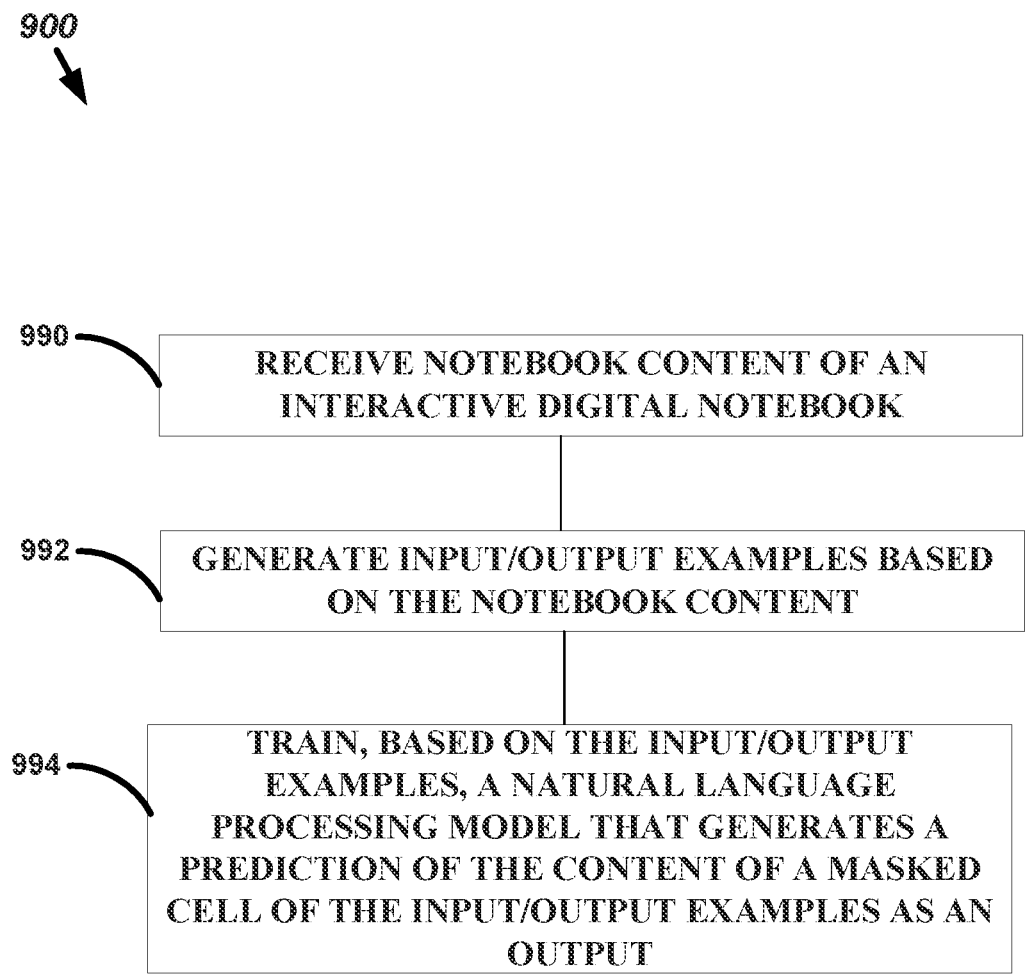
FIG. 9 illustrates, by way of example, a block diagram of an embodiment of a method for generating an automatic notebook infilling model.

FIG. 9 illustrates, by way of example, a block diagram of an embodiment of a method 900 for generating an automatic notebook model. The method 900 as illustrated includes receive notebook content of an interactive digital notebook, at operation 990; generate input/output examples based on the notebook content, at operation 992; and train, based on the input/output examples, a natural language processing model that generates a prediction of the content of a second masked cell as an output, at operation 994. The notebook content: including a sequence of respective cells comprising a markdown cell immediately followed by a code cell, the markdown cell indicating code that is to be entered in the code cell. The operation 992 can include masking one of (i) content of the markdown cell or (ii) content of the code cell resulting in a masked cell. The operation 992 can include identifying the masked cell and content of another cell of the markdown cell or the code that is not masked as an input for an input/output example. The operation 992 can include identifying the content of the masked cell as an output for the input/output example.

The method 900 can further include, wherein the received notebook content further includes a grading cell immediately after the code cell or the markdown cell, the grading cell including content that tests whether the code in the code cell of the markdown cell is accurate. The method 900 can further include providing the masked cell and content of another cell includes further providing the grading cell as part of the input of the input/output example. The method 900 can further include, wherein masking one of the (i) content of the markdown cell or (ii) content of the code cell resulting in a masked cell includes masking the content: of the code cell. The method 900 can further include, wherein masking one of the (i) content of the markdown cell or (ii) content of the code cell resulting in a masked cell includes masking the content of the markdown cell.

The method 900 can further include providing a control code to the natural language processing model indicating whether the masked cell is the markdown cell or the code cell. The method 900 can further include, wherein the control code further indicates whether the markdown cell includes a header, formula, or a combination thereof. The method 900 can further include, wherein the control code further indicates whether the code cell includes a function definition, includes a class, includes an import statement, or a combination thereof.

The method 900 can further include, wherein the natural language processing model is a sequence-to-sequence transformer model. The method 900 can further include, evaluating the natural language model based on whether the code generated by the natural language processing model in predicting the contents of the code cell passes the tests in the grading cell. The method 900 can further include executing the natural language model to generate multiple hypotheses of solutions to the code to be entered and presenting only hypotheses that are consistent with content in the grading cell.

The method 900 can further include executing the natural language processing model based on input of a first type, the input including a masked cell. The method 900 can further include providing output, of a second different type, from the natural language processing model as contents of the masked cell, wherein the first type is one of markdown or code and the second type is the other of markdown or code.

Note that multiple kinds of documentation can be added to a notebook. There are some prompt cells that document and summarize more than one neighboring cell, and there are often whole-notebook summaries places at the beginning of a notebook. The NLP model can generate such summaries at the beginning of the notebook or that summarize multiple cells. The model can produce a block of import statements conditioned on a beginning summary of the general task that is to be completed in the notebook.

Artificial intelligence (AT) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization, A gradient (e.g., partial derivative) is computed with respect to layer parameters (e.g., aspects of the weight) to provide a direction, and possibly a degree, of correction, but does not result in a single correction to set the weight to a "correct" value. That is, via, several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN here "forward" means that the data starts at the input neurons and follows the directed graph of neuron connections until the output neurons are reached and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 10:
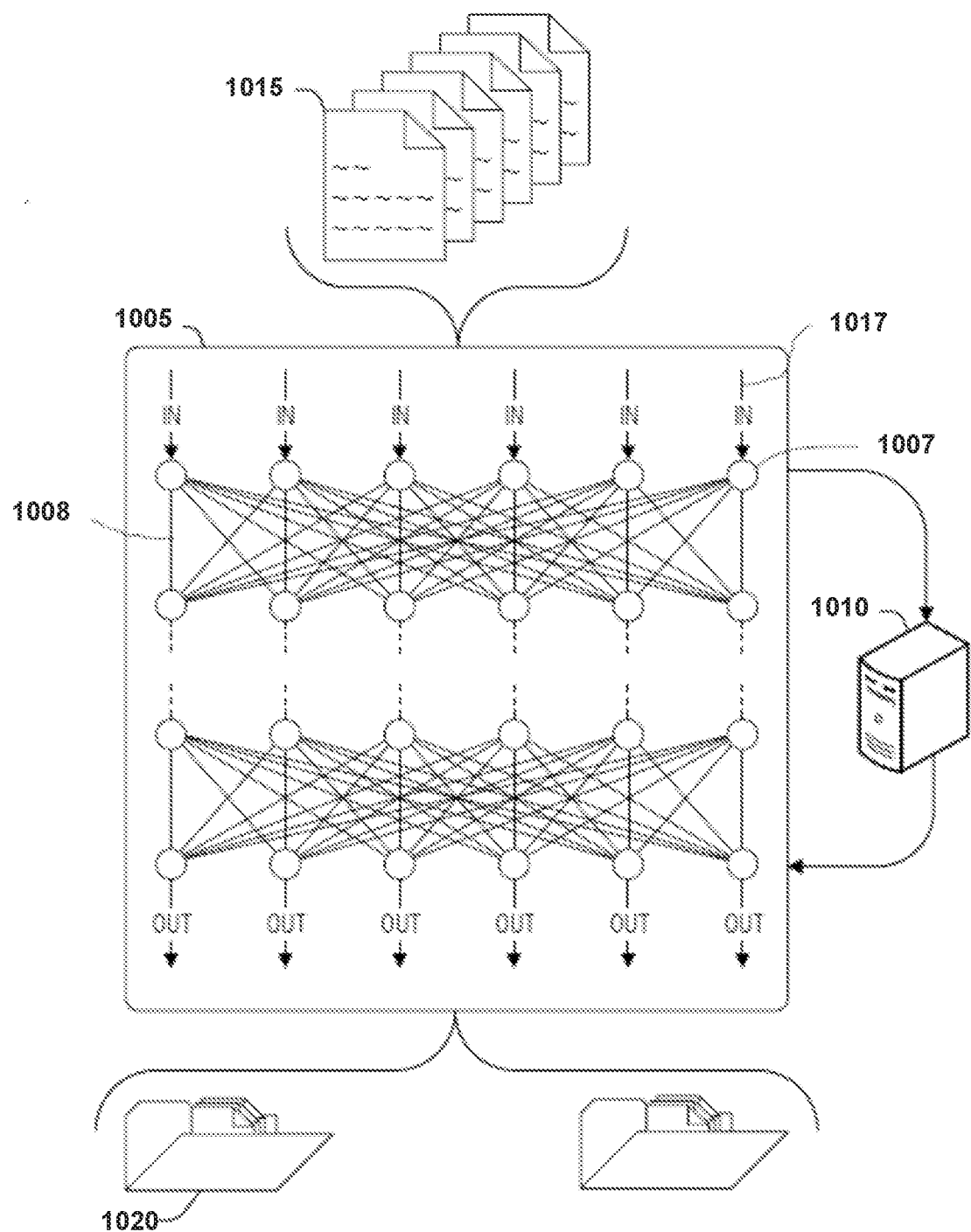
FIG. 10 is a block diagram of an example of an environment including a system for neural network training, according to an embodiment.

FIG. 10 is a block diagram of an example of an environment including a system for neural network training, according to an embodiment. The system can aid in training of a natural language processing model that automatically fills in a cell of the notebook 122 according to one or more embodiments. The system includes an artificial NN (ANN) 1005 that is trained using a processing node 1010. The processing node 1010 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 1005, or even different nodes 1007 within layers. Thus, a set of processing nodes 1010 is arranged to perform the training of the ANN 1005.

The set of processing nodes 1010 is arranged to receive a training set 1015 for the ANN 1005. The training set 1015 can be generated in accord with the method 200. The ANN 1005 comprises a set of nodes 1007 arranged in layers (illustrated as rows of nodes 1007) and a set of inter-node weights 1008 (e.g., parameters) between nodes in the set of nodes. In an example, the training set 1015 is a subset of a complete training set. Here, the subset may enable processing nodes with limited storage resources to participate in training the ANN 1005.

The training data may include multiple numerical values representative of a domain, such as a word, symbol, other part of speech, a cell of a notebook, or the like. Each value of the training or input 1017 to be classified after ANN 1005 is trained, is provided to a corresponding node 1007 in the first layer or input layer of ANN 1005. The values propagate through the layers and are changed by the objective function.

As noted, the set of processing nodes is arranged to train the neural network to create a trained neural network. After the ANN is trained, data input into the ANN will produce valid classifications 1020 (e.g., the input data 1017 will be assigned into categories), for example. The training performed by the set of processing nodes 1007 is iterative. In an example, each iteration of the training the ANN 1005 is performed independently between layers of the ANN 1005. Thus, two distinct layers may be processed in parallel by different members of the set of processing nodes. In an example, different layers of the ANN 1005 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 1007 (e.g., neurons) are trained independently. In an example, the nodes are trained on different hardware.

Figure 11:
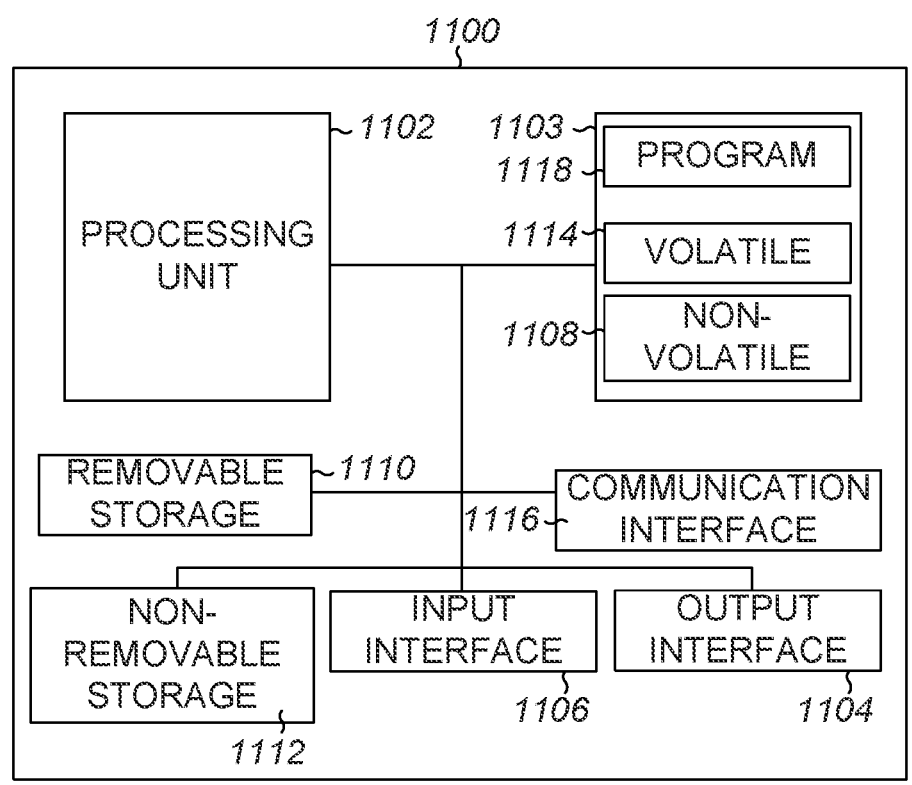
FIG. 11 illustrates, by way of example, a block diagram of an embodiment of a machine (e.g., a computer system) to implement one or more embodiments.

FIG. 11 illustrates, by way of example, a block diagram of an embodiment of a machine 1100 (e.g., a computer system) to implement one or more embodiments. The machine 1100 can implement the method 200 or 900. The kernel 114, processing circuitry 112, display 116, the architecture 600, the embedding block 774, loss block 782, or a portion or a component thereof can include one or more of the components of the machine 1100. One or more of the method 200 or 900, the kernel 114, processing circuitry 112, display 116, the architecture 600, the embedding block 774, loss block 782, or a component or operations thereof can be implemented, at least in part, using a component of time machine 1100. One example machine 1100 (in the form of a computer), may include a processing unit 1102, memory 1103, removable storage 1110, and non-removable storage 1112. Although the example computing device is illustrated and described as machine 1100, the computing device may be in different forms in different embodiments. For example, the computing device may instead be a smartphone, a tablet, smartwatch, or other computing device including the same or similar elements as illustrated and described regarding FIG. 11. Devices such as smartphones, tablets, and smartwatches are generally collectively referred to as mobile devices. Further, although the various data storage elements are illustrated as part of the machine 1100, the storage may also or alternatively include cloud-based storage accessible via a network, such as the Internet.

Memory 1103 may include volatile memory 1114 and non-volatile memory 1108. The machine 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 1100 may include or have access to a computing environment that includes input 1106, output 1104, and a communication connection 1116. Output 1104 may include a display device, such as a touchscreen, that also may serve as an input device. The input 1106 may include one or more of a touchscreen, touchpad, mouse, keyboard, camera, one or more device-specific buttons, one or more sensors integrated within or coupled via wired or wireless data connections to the machine 1100, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1102 (sometimes called processing circuitry) of the machine 1100. A hard drive, CD-ROM, and RAM are some examples of articles including a non-transitory computer-readable medium such as a storage device. For example, a computer program 1118 may be used to cause processing unit 1102 to perform one or more methods or algorithms described herein.

The operations, functions, or algorithms, such as the loss block or the embedding block, or other block described herein may be implemented in software, hardware, or firmware, or a combination thereof in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

Additional Notes and Examples

Example 1 can include a method comprising receiving notebook content of an interactive digital notebook, the notebook content including a sequence of respective cells comprising a markdown cell immediately followed by a code cell, the markdown cell indicating code that is to be entered in the code cell, generating input/output examples by, for each input/output example: masking one of (i) content of the markdown cell or (ii) content of the code cell resulting in a masked cell, identifying the masked cell and content of another cell of the markdown cell or the code that is not masked as an input for an input/output example, and identifying the content of the masked cell as an output for the input/output example, and training, based on the input/output: examples, a natural language processing model that generates a prediction of the content of a second masked cell as an output.

In Example 2, Example 1 can further include, wherein the received notebook content further includes a grading cell immediately after the code cell or the markdown cell, the grading cell including content that tests whether the code in the code cell of the markdown cell is accurate, and providing the masked cell and content: of another cell includes further providing the grading cell as part of the input of the input/output example.

In Example 3, at least one of Examples 1-2 can further include, wherein masking one of the (i) content of the markdown cell or (ii) content of the code cell resulting in a masked cell includes masking the content of the code cell.

In Example 4, at least one of Examples 1-3 can further include, wherein masking one of the (i) content of the markdown cell or (ii) content of the code cell resulting in a masked cell includes masking the content of the markdown cell.

In Example 5, at least one of Examples 1-4 can further include providing a control code to the natural language processing model indicating whether the masked cell is the markdown cell or the code cell.

In Example 6, Example 5 can further include, wherein the control code further indicates whether the markdown cell includes a header, formula, or a combination thereof.

In Example 7, at least one of Examples 5-6 can further include, wherein the control code further indicates whether the code cell includes a function definition, includes a class, includes an import statement, or a combination thereof.

In Example 8, at least one of Examples 1-7 can further include, wherein the natural language processing model is a sequence-to-sequence transformer model.

In Example 9, at least one of Examples 2-8 can further include evaluating the natural language processing model based on whether the code generated by the natural language processing model in predicting the contents of the code cell passes the tests in the grading cell.

In Example 10, Example 9 can further include executing the natural language model to generate multiple hypotheses of solutions to the code to be entered and presenting only hypotheses that are consistent with content in the grading cell.

In Example 11, at least one of Examples 1-10 can further include executing the natural language processing model based on input of a first type, the input including a masked cell, and providing output, of a second different type, from the natural language processing model as contents of the masked cell, wherein the first type is one of markdown or code and the second type is the other of markdown or code.

Example 12 includes a system comprising processing circuitry, and a memory including instructions that, when executed by the processing circuitry, cause the processing circuitry to perform operations comprising receiving notebook content of an interactive digital notebook, the notebook content including a sequence of respective cells comprising a markdown cell immediately followed by a code cell, the markdown cell indicating code that is to be entered in the code cell, generating input/output examples by, for each input/output example: masking one of (i) content of the markdown cell or (ii) content of the code cell resulting in a masked cell, identifying the masked cell and content of another cell of the markdown cell or the code that is not masked as an input for an input/output example, and identifying the content of the masked cell as an output for the input/output example, and training, based on the input/output examples, a natural language processing model that generates a prediction of the content of a second masked cell as an output.

In Example 13, Example 12 can further include, wherein the received notebook content further includes a grading cell immediately after the code cell or the markdown cell, the grading cell including content that tests whether the code in the code cell of the markdown cell is accurate and providing the masked cell and content of another cell includes further providing the grading cell as part of the input of the input/output example.

In Example 14, at least one of Examples 12-13 can further include, wherein masking one of the (i) content of the markdown cell or (ii) content of the code cell resulting in a masked cell includes masking the content of the code cell.

In Example 15, at least one of Examples 12-14 can further include, wherein masking one of the (i) content of the markdown cell or (ii) content of the code cell resulting in a masked cell includes masking the content of the markdown cell.

Example 16 can include anon-transitory machine-readable medium including instructions that, when executed by a machine, cause the machine to perform operations comprising receiving notebook content of an interactive digital notebook, the notebook content including a sequence of respective cells comprising a markdown cell immediately followed by a code cell, the markdown cell indicating code that is to be entered in the code cell, generating input/output examples by, for each input/output example: masking one of (i) content of the markdown cell or (ii) content of the code cell resulting in a masked cell, identifying the masked cell and content of another cell of the markdown cell or the code that is not masked as an input for an input/output example, and identifying the content of the masked cell as an output for the input/output example, and training, based on the input/output examples, a natural language processing model that generates a prediction of the content of a second masked cell as an output.

In Example 17, Example 16 can further include, wherein the operations further comprise providing a control code to the natural language processing model indicating whether the masked cell is the markdown cell or the code cell.

In Example 18, Example 17 can further include, wherein the control code further indicates whether the markdown cell includes (i) a header, (n) a formula, or (iii) a combination thereof, whether the code cell includes (i) a function definition, (ii) a class, (iii) an import statement, (iv) or a combination thereof.

In Example 19, at least one of Examples 16-18 can further include, evaluating the natural language processing model based on whether the code generated by the natural language model in predicting the contents of the code cell passes the tests in a grading cell of the notebook.

In Example 20, at least one of Examples 16-19 can further include, wherein the operations further comprise executing the natural language processing model based on input of a first type, the input including a masked cell, and providing output, of a second different type, from the natural language processing model as contents of the masked cell, wherein the first type is one of markdown or code and the second type is the other of markdown or code.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
receiving notebook content of an interactive digital notebook, the notebook content including a sequence of respective cells comprising a markdown cell immediately followed by a code cell, the markdown cell indicating code that is to be entered in the code cell;
generating input/output examples by; for each input/output example:
masking one of (i) content of the markdown cell or (ii) content of the code cell resulting in a masked cell;
identifying the masked cell and content of another cell of the markdown cell or the code that is not masked as an input for an input/output example; and
identifying the content the masked cell as an output for the input/output example; and
training, based on the input/output examples, a natural language processing model that generates a prediction of the content of a second masked cell as an output.

2. The method of claim 1, wherein:
the received notebook content further includes a grading cell immediately after the code cell or the markdown cell, the grading cell including content that tests whether the code in the code cell of the markdown cell is accurate; and
providing the masked cell and content of another cell includes further providing the grading cell as part of the input of the input/output example.

3. The method of claim 1, wherein masking one of the (i) content of the markdown cell or (ii) content of the code cell resulting in a masked cell includes masking the content of the code cell.

4. The method of claim 1, wherein masking one of the (i) content of the markdown cell or (ii) content of the code cell resulting in a masked cell includes masking the content of the markdown cell.

5. The method of claim 1, further comprising providing a control code to the natural language processing model indicating whether the masked cell is the markdown cell or the code cell.

6. The method of claim 5, wherein the control code further indicates whether the markdown cell includes a header, formula, or a combination thereof.

7. The method of claim 5, wherein the control code further indicates whether the code cell includes a function definition, includes a class, includes an import statement, or a combination thereof.

8. The method of claim 1, wherein the natural language processing model is a sequence-to-sequence transformer model.

9. The method of claim 2, further comprising evaluating the natural language processing model based on whether the code generated by the natural language processing model in predicting the contents of the code cell passes the tests in the grading cell.

10. The method of claim 9, further comprising executing the natural language model to generate multiple hypotheses of solutions to the code to be entered and presenting only hypotheses that are consistent with content in the grading cell.

11. The method of claim 1, further comprising:
executing the natural language processing model based on input of a first type, the input including a masked cell; and
providing output, of a second different type, from the natural language processing model as contents of the masked cell, wherein the first type is one of markdown or code and the second type is the other of markdown or code.

12. A system comprising:
processing circuitry;
a memory including instructions that, when executed by the processing circuitry, cause the processing circuitry to perform operations comprising:
receiving notebook content of an interactive digital notebook, the notebook content including a sequence of respective cells comprising a markdown cell immediately followed by a code cell, the markdown cell indicating code that is to be entered in the code cell;
generating input/output examples by, for each input/output example:
masking one of (i) content of the markdown cell or (ii) content of the code cell resulting in a masked cell;
identifying the masked cell and content of another cell of the markdown cell or the code that is not masked as an input: for an input/output example; and
identifying the content of the masked cell as an output for the input/output example; and
training, based on the input/output examples, a natural language processing model that generates a prediction of the content of a second masked cell as an output.

13. The system of claim 12, wherein:
the received notebook content further includes a grading cell immediately after the code cell or the markdown cell, the grading cell including content that tests whether the code in the code cell of the markdown cell is accurate; and providing the masked cell and content of another cell includes further providing the grading cell as part of the input of the input/output example.

14. The system of claim 12, wherein masking one of the (i) content of the markdown cell or (ii) content of the code cell resulting in a masked cell includes masking the content of the code cell.

15. The system of claim 12, wherein masking one of the (i) content of the markdown cell or (ii) content of the code cell resulting in a masked cell includes masking the content of the markdown cell.

16. A non-transitory machine-readable medium including instructions that, when executed by a machine, cause the machine to perform operations comprising:
   receiving notebook content of an interactive digital notebook, the notebook content including a sequence of respective cells comprising a markdown cell immediately followed by a code cell, time markdown cell indicating code that is to be entered in the code cell;
   generating input/output examples by, for each input/output example:
      masking one of (i) content of the markdown cell or (ii) content of the code cell resulting in a masked cell;
      identifying the masked cell and content of another cell of the markdown cell or the code that is not masked as an input for an input/output example; and
      identifying the content of the masked cell as an output for the input/output example; and
   training, based on the input/output examples, a natural language processing model that generates a prediction of the content of a second masked cell as an output.

17. The non-transitory machine-readable medium of claim 16, wherein the operations further comprise providing a control code to the natural language processing model indicating whether the masked cell is the markdown cell or the code cell.

18. The non-transitory machine-readable medium of claim 17, wherein the control code further indicates whether the markdown cell includes (i) a header, (ii) a formula, or (iii) a combination thereof, whether the code cell includes (i) a function definition, (ii) a class, (iii) an import statement; (iv) or a combination thereof.

19. The non-transitory machine-readable medium of claim 16, evaluating the natural language processing model based on whether the code generated by the natural language model in predicting the contents of the code cell passes the tests in a grading cell of the notebook.

20. The non-transitory machine-readable medium of claim 16, wherein the operations further comprise:
   executing the natural language processing model based on input of a first type, the input including a masked cell; and
   providing output, of a second different type, from the natural language processing model as contents of the masked cell, wherein the first type is one of markdown or code and the second type is the other of markdown or code.

* * * * *